April 24, 1934.  J. V. O. PALM  1,956,465
BEARING MANUFACTURE
Filed Aug. 16, 1930
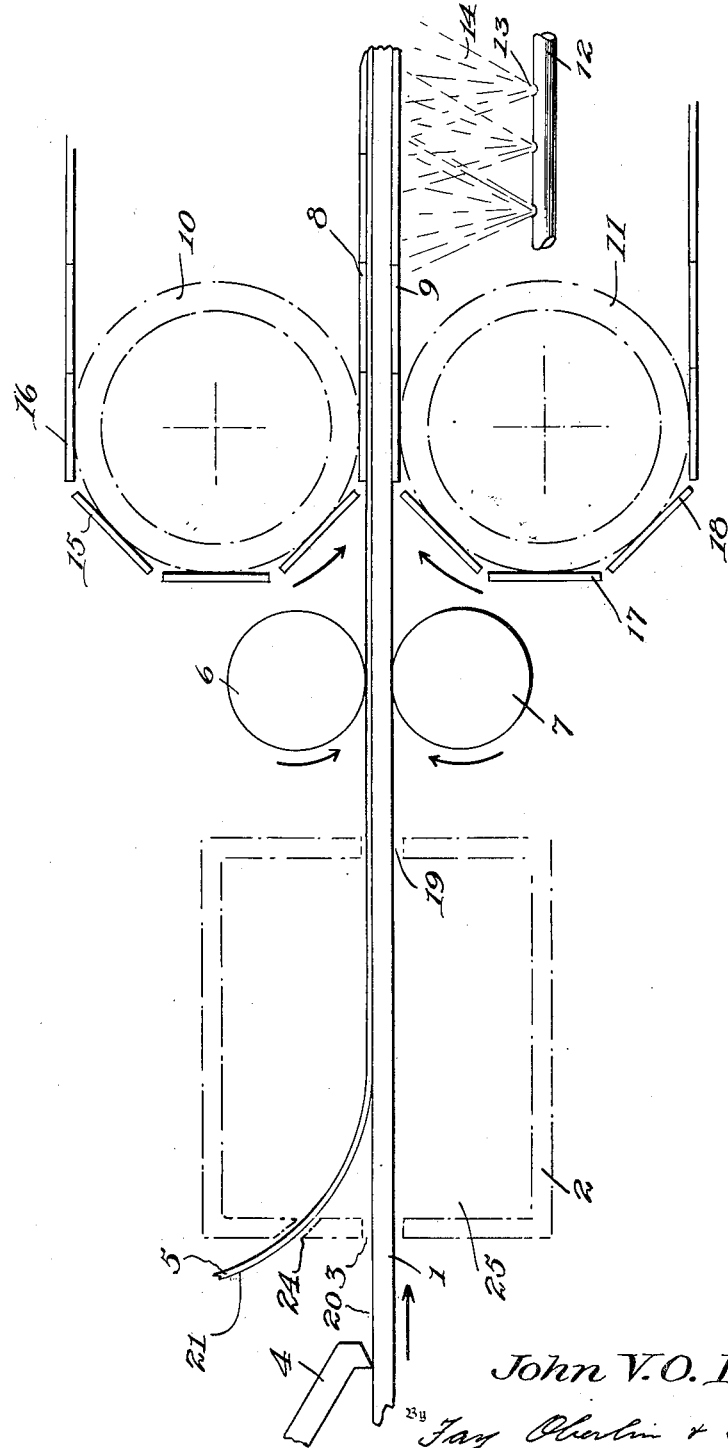
Inventor
John V. O. Palm
By Jay Oberlin & Jay
Attorneys Patented Apr. 24, 1934

1,956,465

UNITED STATES PATENT OFFICE 1,956,465

BEARING MANUFACTURE

John V. O. Palm, Cleveland Heights, Ohio, assignor to The Cleveland Graphite Bronze Company, Cleveland, Ohio, a corporation of Ohio Application August 16, 1930, Serial No. 475,737

3 Claims. (Cl. 29—149.5)

This invention, relating, as indicated, to bearing manufacture, is more particularly directed to a novel method of producing journal bearings, as distinguished from ball and roller bearings.

Ordinarily, the housings which receive bearings are castings, and the bearing material which may be babbitt is poured against the housing, this process being quite costly because of the fact that the babbitt must be of considerable thickness due to the irregularity of the cast housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer tears out more easily than a thin lining of babbitt backed with hard material.

A second well known method, which has supplanted to a large extent the above mentioned pouring method, in the bearing industry, is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem heretofore unsolved is how to unite these two metals, which have such different properties, so that the cost of such union plus the cost of materials is less than the total cost of a lined housing, or a lined brass backed bearing. I have found that either bronze, babbitt, or other suitable bearing material in the form of strips, may be united to steel, and that this thickness of the babbitt, or equivalent bearing material, may be materially reduced and yet such a bearing will outlast a thick, cast, bearing, and in the event of replacement the cost is only a fraction of what it would be under former conditions.

A further and important objection to replacing worn out bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all the old babbitt removed, and then the bearing housing is cast with babbitt. With the use of my improved thin wall bearings all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing in automobiles.

In this particular instance I have aimed to provide a means of joining bearing lining material to bearing backing material without the use of solder, thereby avoiding the expense of solder as well as the cost of placing the solder in position and the cost of heating the solder. I have also aimed to overcome the difficulty which has been caused by oxidization of the bearing backing material that occurs, as stated before, very rapidly when the bearing backing material has been heated to high temperatures.

To the accomplishment of the foregoing and related ends, said invention, then, consists of the means hereinafter fully described and particularly pointed out in the claims; the annexed drawing and the following description setting forth in detail one method, one product and certain mechanism exemplifying my invention, such disclosed mechanism, procedure and product constituting, however, but one of various applications of the principle of my invention.

In said annexed drawing:—

The figure shows a side elevation of the apparatus used in part of my improved method.

Referring now to the drawing, a strip of bearing backing material 1 is shown passing under a scarifying means 4 in order to provide said strip with a dead clean surface so that such surface will readily take a superposed layer and bond itself thereto. Other means of producing a dead clean surface may be used, such as machining, sanding or grinding, the main factor being to provide a surface which is clean and irregular so that an anchorage results, which grips the softer bearing facing material. The strip 1 passes through a heat chamber 2, the atmosphere 25 of this chamber being maintained in a non-oxidizing condition so that as the backing material, which may be steel, is heated to a temperature at which it will unite with the bearing facing material, no oxidization of the surface 20 will take place. The strip 1 passes through an opening 3 which may have flaps or other means (not shown) for preventing escape of the non-oxidizing atmosphere within the chamber 2, and the same means may be provided at the exit 19 for the same purpose. The heat chamber 2 is provided with an opening 24 situated directly above the opening 23 and in line therewith, this opening being provided in order to admit a strip 5 of bearing facing material, which may be babbitt. Thus it will be seen that as the two strips 1 and 5 are fed into the chamber 2 the surfaces 20 and 21 will be caused to contact each other, and since no oxygen can reach the surface 20 once the strip 1 is inside the chamber the placing of the strip 5 thereupon effectively excludes all oxygen after the strip reaches the chamber. From this it will be seen that the chamber 2 serves the double purpose of preventing oxidization and heating the strips to a temperature at which they will readily unite. After the two heated strips pass through the opening 19 they are engaged by the feed rollers 6 and 7, and are then immediately fed into a pressure means which I have termed a pressure belt.

Briefly stated, the pressure belt consists of an upper belt 8 which revolves about two sprockets, one of which is shown at 10. This belt consists of plates 15 and 16 held together by pin connected lugs, and resembles in appearance, traction plates as used on tractors. The plates 15 and 16 when they reach the area denoted at 8, tightly abut each other, and are forced downwardly under enormous hydraulic pressure. The lower belt 9 is practically the same as the upper belt and consists of plates 17 and 18, the whole belt revolving about two sprockets, one of which is shown at 11. The lower belt 9 has its lowermost horizontal portion adjacent the strip supported in such a manner as to receive the thrust of the upper belt, which results in the two strips being pressed firmly together. The pressure causes the softer facing material, which as before stated, may be of babbitt, to become anchored or wedged in the scarifications on the surface 20 of the strip 1. After the strips have been pressed to the point of solidification they are cooled by means of a spray 14 which is ejected from the openings 13 in a cooling fluid supply line 12. The exact position of the spray depends upon the material which is being united, and is usually not placed closely adjacent the sprocket 11. This is done in order to insure setting of the bond before cooling, as the cooling if done too soon might tend to disrupt the bond.

My improved method of manufacturing bearings is as follows:

A strip 1 of bearing backing material, which is usually steel, has one surface 20 scarified or otherwise treated to present a dead clean surface, and is then immediately passed into a heating chamber where another strip is superposed thereon, the latter strip being bearing facing material such as babbitt or bronze. Both of said strips are heated in this chamber and are completely enveloped in an atmosphere which is free from oxygen, such as a nitrogen or carbon dioxide atmosphere. After the strips have been brought to a heat suitable for bonding they are passed out of the furnace and between two metallic belts where they are pressed together under enormous pressure. Bearing facing material or babbitt being softer than the bearing backing material is forced into the before mentioned scarifications, after which the strips are cooled and solidified into one composite strip of material suitable for making bearings. The strip is then removed from the pressure mechanism, cut into blanks of the desired size and then formed into either whole or half round bearings.

From the foregoing it will be seen that the expense and labor involved in the use of an adhesive, such as solder, is completely done away with, and that any oxidization of the backing material which occurs so readily under ordinary circumstances is completely avoided. Consequently, it will be noted that the manufacture of my improved bearing costs very little as compared to other present day methods in that both labor and material are saved.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a continuous process for manufacturing bearings, the steps which consist of passing a continuous strip of bearing backing metal through a heating chamber having a reducing atmosphere, simultaneously passing a strip of bearing metal through said chamber in superimposed relationship to said backing metal strip, and then passing and pressing together said strips between a plurality of synchronously moving flat plates.

2. In a continuous process for manufacturing bearings, the steps which consist of cleaning and scarifying the upper surface of a continuous strip of bearing backing metal, passing said strip through a heating chamber having a reducing atmosphere, simultaneously passing a strip of bearing metal through said chamber in superimposed relationship to said backing metal strip, and then passing and pressing together said strips between a plurality of synchronously moving flat plates.

3. In a continuous process for manufacturing bearings, the steps which consist of passing a continuous strip of bearing backing metal through a heating chamber having a reducing atmosphere, simultaneously passing a strip of bearing metal through said chamber in superimposed relationship to said backing metal strip, and then passing and pressing together said strips between a plurality of synchronously moving flat plates, and cooling said plates during the passage of said strips.

JOHN V. O. PALM.